United States Patent
Liu et al.

(10) Patent No.: US 9,103,667 B2
(45) Date of Patent: Aug. 11, 2015

(54) ALIGNMENT METHOD FOR OPTICAL AXES OF COMPOSITE WAVEPLATE

(71) Applicant: Huazhong University of Science and Technology, Wuhan (CN)

(72) Inventors: Shiyuan Liu, Wuhan (CN); Honggang Gu, Wuhan (CN); Xiuguo Chen, Wuhan (CN); Chuanwei Zhang, Wuhan (CN); Weiqi Li, Wuhan (CN); Weichao Du, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 14/341,744

(22) Filed: Jul. 25, 2014

(65) Prior Publication Data

US 2015/0029507 A1 Jan. 29, 2015

(30) Foreign Application Priority Data

Jul. 26, 2013 (CN) .......................... 2013 1 0320167

(51) Int. Cl.
*G01J 3/28* (2006.01)
*G01B 11/27* (2006.01)
*G02B 5/30* (2006.01)
*G02B 27/62* (2006.01)

(52) U.S. Cl.
CPC ............ *G01B 11/272* (2013.01); *G02B 5/3083* (2013.01); *G02B 27/62* (2013.01)

(58) Field of Classification Search
CPC ................. G01J 3/02; G01J 3/28; G01J 3/42; G01J 3/18; G01J 3/447; G01N 21/31; G01N 21/211; G01N 21/552
USPC .................................................. 356/300–445
See application file for complete search history.

(56) References Cited

U.S. PATENT DOCUMENTS

2005/0068529 A1* 3/2005 Montarou et al. ............ 356/364

* cited by examiner

*Primary Examiner* — Abdullahi Nur
(74) *Attorney, Agent, or Firm* — Matthias Scholl P.C.; Matthias Scholl

(57) ABSTRACT

An alignment method for optical axes of a composite waveplate includes rotating a rotatable waveplate, which rotates about a central axis with respect to a fixed waveplate, and adjusting the rotation angle thereof until the differences between the spectral parameters of the composite waveplate and ideal spectral parameters are smaller than preset values.

8 Claims, 6 Drawing Sheets

ALIGNMENT METHOD FOR OPTICAL AXES OF COMPOSITE WAVEPLATE

CROSS-REFERENCES TO RELATED APPLICATIONS

Pursuant to 35 U.S.C. §119 and the Paris Convention Treaty, this application claims the benefit of Chinese Patent Application No. 201310320167.1 filed Jul. 26, 2013, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention generally relates to the field of composite waveplates, and more particularly to an alignment method for optical axes of a composite waveplate. The method of the invention is suitable for accurate alignment and calibration of optical axes of a composite waveplate consisting of two or more single crystal plates.

2. Description of the Related Art

A waveplate (also known as optical phase retardation plate) is an optical device commonly used in the fields of optical instrument design and optical measurement, and it can introduce a phase shift (also called phase retardation) between two orthogonal components of a polarized light and can be used to modulate or detect polarization states of the polarized light. A waveplate is also a crystal plate since it is generally produced from uniaxial or biaxial crystals (i.e. birefringent materials) such as quartz, mica, magnesium fluoride, gypsum, sapphire, and so on. A waveplate composed of one crystal plate is called a single plate, and a waveplate composed of two or more crystal plates is called a composite waveplate.

The composite waveplate is a combination of multiple crystal plates, and optical axes of the crystal plates are aligned to form certain angles (normally 90 or 0 degree). A biplate is the simplest and most commonly used composite waveplate composed of two crystal plates produced from identical or different materials and having optical axes perpendicular or parallel to each other. The biplate composed of two crystal plates produced from the same material features a retardance effect identical to a single plate produced from the same material when the optical axes of the biplate are perpendicular to each other, and the difference of the thicknesses of the two crystal plates is an equivalent optical path of the biplate, which make it possible to solve the problem of the single plate that it is too thin to manufacture and, thus, improves the accuracy of the waveplate. The biplate composed of two crystal plates produced from different materials is referred to as an achromatic composite waveplate since it is capable of eliminating the chromatic aberration of the waveplate. It is impossible for a single crystal plate to achieve the functions of the composite waveplate in improving accuracy and eliminating the chromatic aberration. Therefore, the composite waveplate is widely used in optical instrument design and optical measurement. In practice, to implement achromatic effect of retardance in a comparatively wide wavelength range, normally a more complex achromatic composite waveplate composed of multiple plates produced from the same or different materials is designed and produced, and angles between the optical axes of the crystal plates have optimally designed values.

In practical applications, to ensure overall retardance accuracy and measurement accuracy of the composite waveplate, alignment and calibration of the optical axes of the different crystal plates forming the composite waveplate are carried out with care.

Conventionally, alignment of the composite waveplate is conducted manually. In the manual method, one crystal plate is fixed firstly, and then the other crystal plate is manually rotated while the actual retardance of the composite waveplate is visually compared with a designed retardance. When a difference between the actual retardance of the composite waveplate and the designed retardance is acceptable, alignment thereof is completed. Although operation of the manual alignment method is comparatively simple, alignment accuracy thereof cannot be guaranteed, which makes it difficult to meet requirement for high measurement accuracy. Another alignment method for the waveplate is a light extinction method, in which the waveplate is disposed between two polarizers perpendicular to each other, and alignment of the optical axes of the waveplate is conducted according to the light extinction of the emitted light from one polarizer disposed after the waveplate in a direction of light propagation. However, the light extinction method has one problem because light extinction often occurs at one specific wavelength, and it is difficult to determine whether the optical axes of the waveplate is accurately aligned according to light extinction of the single specific wavelength. To solve this problem, laser light sources with different wavelengths need to be used, and correspondingly optical paths need to be adjusted in accordance with the different wavelengths, which results in complex operation and low alignment accuracy.

R. W. Collins et al. at University of Pennsylvania disposed a composite waveplate to be aligned on a high-accuracy rotating table, placed the high-accuracy rotating table on a sample stage of a rotating-analyzer ellipsometer, and set a polarization generation arm and a polarization detection arm of the rotating-analyzer ellipsometer in a straight-through mode to measure the amplitude ratio of the polarized light passing through the composite waveplate. During alignment, the high-accuracy rotating table controlled the rotation of the crystal plates, and the alignment of the composite waveplate was carried out by adjusting the high-frequency oscillations of the amplitude ratio of the polarized light passing through the composite waveplate and measured by the ellipsometer (see, Journal of the Optical Society of America A, Vol. 18, page 1980-1985, 2001). Although the accuracy of this alignment method is higher than that of the conventional manual alignment method, final alignment accuracy is largely dependent on the experience of the operator due to the complexity of this alignment process. At present, there is another method for guiding the alignment of the composite waveplate by detecting and controlling the fluctuation amplitude in the spectral curve of retardance of the composite waveplate. This method is theoretically capable of aligning the composite waveplate with high accuracy. However, since fluctuation in the spectral curve of retardance of the composite waveplate is not sensitive to an alignment error between composite waveplates, alignment accuracy thereof cannot be ensured when the accuracy of a device for detecting retardance is not high enough.

SUMMARY OF THE INVENTION

In view of the above-mentioned problems, it is one objective of the invention to provide an accurate alignment method for the optical axes of a composite waveplate by detecting and eliminating fluctuation in spectral parameters of the composite waveplate.

In accordance with an exemplary embodiment of the invention, provided is an alignment method for achieving accurate alignment of the optical axes of the multiple single plates in the composite waveplate. For any two adjacent waveplates, the alignment method comprises steps of:

fixing one of the two waveplates and arranging the other one in parallel thereto, the other one being a rotatable waveplate capable of rotating about a central axis with respect to the fixed waveplate;

vertically irradiating polarized light on the fixed waveplate, and allowing the light to sequentially pass through the fixed waveplate and the rotatable waveplate;

detecting and analyzing a light intensity signal of the emitted light to obtain spectral parameters of the composite waveplate composed of the fixed waveplate and the rotatable waveplate;

comparing the spectral parameters of the composite waveplate with ideal spectral parameters to obtain differences therebetween; and adjusting a rotation angle of the rotatable waveplate rotating about the central axis with respect to the fixed waveplate so that the differences between the spectral parameters of the composite waveplate and the ideal spectral parameters are smaller than preset values.

In a class of this embodiment, the spectral parameters of the composite waveplate comprise an equivalent rotary angle spectrum $P_e(\lambda)$, an equivalent axis azimuth spectrum $\theta_e(\lambda)$, and an equivalent retardance spectrum $\delta_e(\lambda)$ that are calculated according to the following equations:

$$P_e = -\arctan\left\{\text{Re}\left[\frac{(m_{21} - m_{12})}{(m_{11} + m_{22})}\right]\right\}$$

$$\theta_e = \frac{1}{2}\arctan\left\{\text{Re}\left[\frac{2(m_{21}m_{22} + m_{11}m_{12})}{(m_{11}^2 + m_{21}^2 - m_{12}^2 - m_{22}^2)}\right]\right\}$$

$$\delta_e = \arg\left(\frac{r_{11}}{r_{22}}\right)$$

where $m_{ij}$ represents four elements of a matrix obtained by multiplying $M(\delta_1, \theta_1)$ by $M(\delta_2, \theta_2)$; $M(\delta_1, \theta_1)$ and $M(\delta_2, \theta_2)$ are characteristic matrices of the two waveplates to be aligned; $r_{ij}$ represents four elements of a matrix obtained by multiplying matrices $$\begin{bmatrix} \cos P_e & -\sin P_e \\ \sin P_e & \cos P_e \end{bmatrix}, \begin{bmatrix} \cos\theta_e & \sin\theta_e \\ -\sin\theta_e & \cos\theta_e \end{bmatrix}, \begin{bmatrix} m_{11} & m_{12} \\ m_{21} & m_{22} \end{bmatrix}, \text{and } \begin{bmatrix} \cos\theta_e & -\sin\theta_e \\ \sin\theta_e & \cos\theta_e \end{bmatrix}$$

together, in which i=1 or 2, and j=1 or 2; $\delta_1$ and $\delta_2$ are retardances of the fixed waveplate and the rotatable waveplate; $\theta_1$ is an angle formed by the optical axis of the fixed waveplate vertically disposed and a horizontal direction; and $\theta_2$ is an angle formed by an optical axis of the rotatable waveplate vertically disposed and a horizontal direction.

In a class of this embodiment, the spectral parameters of the composite waveplate are detected via an ellipsometer, and advantageously via a dual rotating-compensator Mueller matrix ellipsometer.

In a class of this embodiment, the waveplates are disposed on a sample stage between a polarization generation arm and a polarization detection arm of the ellipsometer. Light beam emitted from the polarization generation arm is vertically projected on the composite waveplate, then passes through the polarization detection arm, and is finally detected so that the spectral parameters are obtained.

In a class of this embodiment, the rotatable waveplate is disposed on a high-accuracy rotating table fixed on the sample stage, and is capable of being rotated about the central axis by the high-accuracy rotating table.

In a class of this embodiment, when the composite waveplate comprises three or more single plates, the fixed waveplate is a fixed composite waveplate composed of multiple single plates having aligned axes.

Generally, people only care about a retardance of a waveplate, and normally a detection device can only determine the value of the retardance. Because the fluctuation amplitude of a retardance curve is insensitive to an alignment error of the composite waveplate and because the accuracy of the detection device is limited, alignment accuracy of the composite waveplate in methods of using the retardance curve cannot be ensured. The method of the invention can simultaneously detect fluctuation in spectral curves of an equivalent retardance spectrum, an equivalent axis azimuth spectrum, and an equivalent rotary angle spectrum of the composite waveplate. Since the fluctuation in the spectral curves of the equivalent axis azimuth spectrum and the equivalent rotary angle spectrum is highly sensitive to the alignment error of the composite waveplate, the method of the invention achieves accurate alignment of the composite waveplate even when the detection accuracy of the detection device for the spectral parameters is limited.

In the invention, one single plate of the composite waveplate to be aligned is fixed in the optical path and referred to as the fixed waveplate. The other single plate is connected to the rotating device and referred to as a rotatable waveplate. The rotatable waveplate is parallel to the fixed waveplate and is capable of continuously be driven by the rotating device to rotate with respect to the fixed waveplate. The polarized light is vertically projected on the fixed waveplate, and is emitted from the rotatable waveplate after passing through the fixed waveplate and the rotatable waveplate. The detector is used for detecting and analyzing the light intensity signal of the light emitted from the rotatable waveplate in order to obtain the spectral parameters ($P_e(\lambda)$, $\theta_e(\lambda)$, and $\delta_e(\lambda)$) of the composite waveplate composed of the fixed waveplate and the rotatable waveplate.

In the invention, if the differences $\Delta P_e(\lambda)$, $\Delta\theta_e(\lambda)$, and $\Delta\delta_e(\lambda)$ are greater than preset values (the preset values are the maximum values of the differences $\Delta P_e(\lambda)$, $\Delta\theta_e(\lambda)$, and $\Delta\delta_e(\lambda)$ allowed in accordance with the required alignment accuracy and can be determined based on actual requirement for the accuracy), the rotatable waveplate is rotated and fluctuation amplitudes of the differences $\Delta P_e(\lambda)$, $\Delta\theta_e(\lambda)$, and $\Delta\delta_e(\lambda)$ are detected. The rotatable waveplate is rotated in the same direction as the previous one if the fluctuation amplitudes decrease, and is rotated in a reverse direction if the fluctuation amplitudes increase until the fluctuation of the differences $\Delta P_e(\lambda)$, $\Delta\theta_e(\lambda)$, and $\Delta\delta_e(\lambda)$ are smaller than the preset values; and then the alignment of the composite waveplate is completed.

In the invention, if the composite waveplate comprises multiple single plates, two single plates are chosen and aligned with respect to each other according to the above-mentioned steps, and are then fixed. Next, the fixed waveplates as a whole are treated as a single plate, and the above-mentioned steps are repeated until all single plates are aligned to each other so that the alignment of the composite waveplate is completed.

Compared to a conventional alignment method for optical axes of a composite waveplate, the alignment method of the invention detects and controls the fluctuation amplitudes of the three equivalent spectral parameters, including the equivalent retardance spectrum, the equivalent axis azimuth spectrum, and the equivalent rotary angle spectrum of the composite waveplate, via an optical detection and analyzing system according to the equivalent model of the composite waveplate, whereby achieving high accuracy alignment of the optical axes of the composite waveplate. The invention features simple operation, controllable alignment accuracy, and wide application prospect in optical instrument design and optical measurement.

DETAILED DESCRIPTION OF THE EMBODIMENTS

For clear understanding of the objectives, features, and advantages of the invention, detailed description of the invention will be given below in conjunction with accompanying drawings and specific embodiments. It should be noted that the embodiments are only meant to explain the invention, and not to limit the scope of the invention.

To clearly illustrate an alignment method for optical axes of a composite waveplate of the invention, a dual rotating-compensator Mueller matrix ellipsometer is illustratively and advantageously used for detection of spectral parameters of the waveplate.

Figure 1:
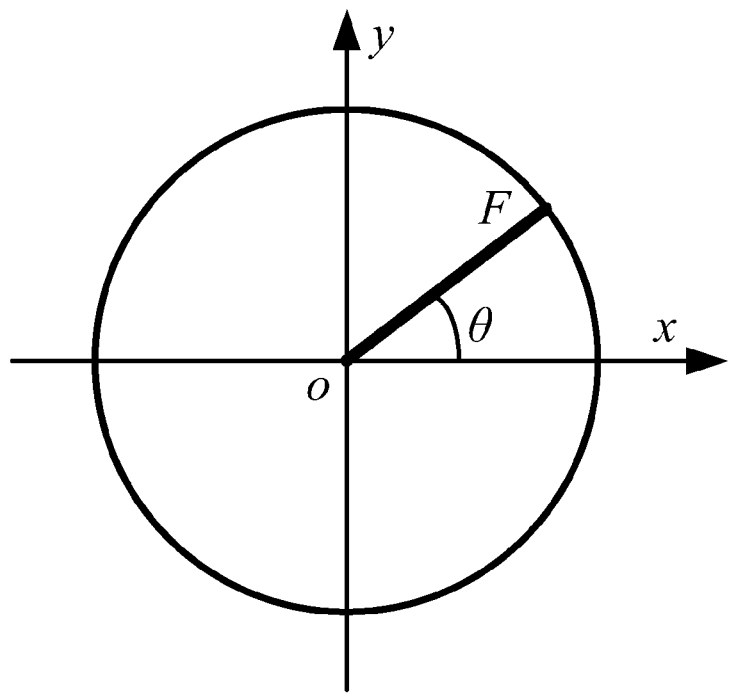
FIG. 1 is a schematic view of a single plate.

As shown in FIG. 1, in an x-o-y coordinate, an angle formed by a fast axis (F axis) of the waveplate and the x axis is $\theta$; a retardance of the waveplate is $\delta$; and a transmission characteristic of the waveplate is expressed as the following equation (1):

$$M(\delta, \theta) = \begin{bmatrix} \cos\theta & -\sin\theta \\ \sin\theta & \cos\theta \end{bmatrix} \begin{bmatrix} e^{i\delta/2} & 0 \\ 0 & e^{-i\delta/2} \end{bmatrix} \begin{bmatrix} \cos\theta & \sin\theta \\ -\sin\theta & \cos\theta \end{bmatrix} \quad (1)$$

where i represents the imaginary unit, and $\delta$ is formulated as the following equation (2):

$$\delta = \frac{2\pi \times dn \times d}{\lambda} \quad (2)$$

where $\lambda$ represents a wavelength; dn represents a birefringence of the materials forming the waveplate at a wavelength of $\lambda$; and d represents a thickness of the waveplate.

A biplate with an arbitrary angle $\alpha$ between the optical axes of the two component waveplates can be expressed by an equivalent model of the following equation (3):

$$M(\delta_e, \theta_e, P_e) = \begin{bmatrix} \cos\theta_e & -\sin\theta_e \\ \sin\theta_e & \cos\theta_e \end{bmatrix} \begin{bmatrix} \cos P_e & \sin P_e \\ -\sin P_e & \cos P_e \end{bmatrix} \begin{bmatrix} e^{i\delta_e/2} & 0 \\ 0 & e^{-i\delta_e/2} \end{bmatrix} \quad (3)$$

$$\begin{bmatrix} \cos\theta_e & \sin\theta_e \\ -\sin\theta_e & \cos\theta_e \end{bmatrix}$$

where $\delta_e$, $\theta_e$, and $P_e$ respectively represent an equivalent retardance, an equivalent angle between the fast axis and the x axis, and a possible equivalent rotary angle of the composite waveplate.

Figure 2:
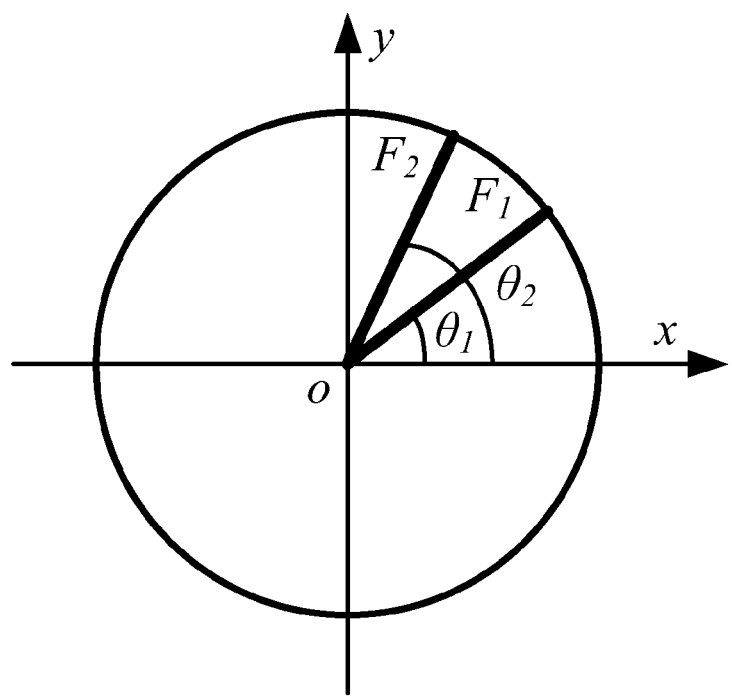
FIG. 2 is a schematic view of a biplate.

As shown in FIG. 2, since the biplate is composed of two single plates, a relationship is expressed as the following equation (4):

$$M(\delta_e, \theta_e, P_e) = M(\delta_2, \theta_2) \cdot M(\delta_1, \theta_1) = \begin{bmatrix} m_{11} & m_{12} \\ m_{21} & m_{22} \end{bmatrix} \quad (4)$$

where $\delta_1$ and $\delta_2$ are retardances of a first waveplate and a second waveplate of the biplate along the propagation direction of light; $\theta_1$ is an angle formed by an optical axis $F_1$ of the first waveplate along the propagation direction of the light and the x axis; $\theta_2$ is an angle formed by an optical axis $F_2$ of the second waveplate along the propagation direction of the light and the x axis; an angle formed by the two optical axes $F_1$ and $F_2$ is $\alpha=|\theta_2-\theta_1|$; $m_{ij}$ (i=1, 2; and j=1, 2) represents four elements of a matrix obtained by multiplying a matrix $M(\delta_1, \theta_1)$ by $M(\delta_2, \theta_2)$; and $M(\delta_1, \theta_1)$ and $M(\delta_2, \theta_2)$ are characteristic matrices of the two waveplates obtained from the above equation (1).

By simultaneously solving equations (3) and (4), expressions of $\delta_e$, $\theta_e$ and $P_e$ can be obtained, in which $P_e$ and $\theta_e$ are firstly solved as the following equations (5) and (6):

$$P_e = -\arctan\left\{\text{Re}\left[\frac{(m_{21}-m_{12})}{(m_{11}+m_{22})}\right]\right\} \quad (5)$$

$$\theta_e = \frac{1}{2}\arctan\left\{\text{Re}\left[\frac{2(m_{21}m_{22}+m_{11}m_{12})}{(m_{11}^2+m_{21}^2-m_{12}^2-m_{22}^2)}\right]\right\} \quad (6)$$

By substituting equation (3) into equations (4)-(6), equation (7) is obtained:

$$\begin{bmatrix} e^{i\delta_e/2} & 0 \\ 0 & e^{-i\delta_e/2} \end{bmatrix} = \begin{bmatrix} \cos P_e & -\sin P_e \\ \sin P_e & \cos P_e \end{bmatrix} \begin{bmatrix} \cos\theta_e & \sin\theta_e \\ -\sin\theta_e & \cos\theta_e \end{bmatrix} \begin{bmatrix} m_{11} & m_{12} \\ m_{21} & m_{22} \end{bmatrix} \quad (7)$$

$$\begin{bmatrix} \cos\theta_e & -\sin\theta_e \\ \sin\theta_e & \cos\theta_e \end{bmatrix} = \begin{bmatrix} r_{11} & r_{12} \\ r_{21} & r_{22} \end{bmatrix}$$

then $\delta_e$ is solved as follows:

$$\delta_e = \arg\left(\frac{r_{11}}{r_{22}}\right) \quad (8)$$

where $r_{ij}$ (i=1, 2; j=1, 2) represents four elements in a matrix obtained by multiplying a $$\text{matrix} \begin{bmatrix} \cos P_e & -\sin P_e \\ \sin P_e & \cos P_e \end{bmatrix} \text{ by matrices}$$

$$\begin{bmatrix} \cos\theta_e & \sin\theta_e \\ -\sin\theta_e & \cos\theta_e \end{bmatrix}, \begin{bmatrix} m_{11} & m_{12} \\ m_{21} & m_{22} \end{bmatrix}, \text{ and } \begin{bmatrix} \cos\theta_e & -\sin\theta_e \\ \sin\theta_e & \cos\theta_e \end{bmatrix}$$

as shown in equation (7).

Figure 3:
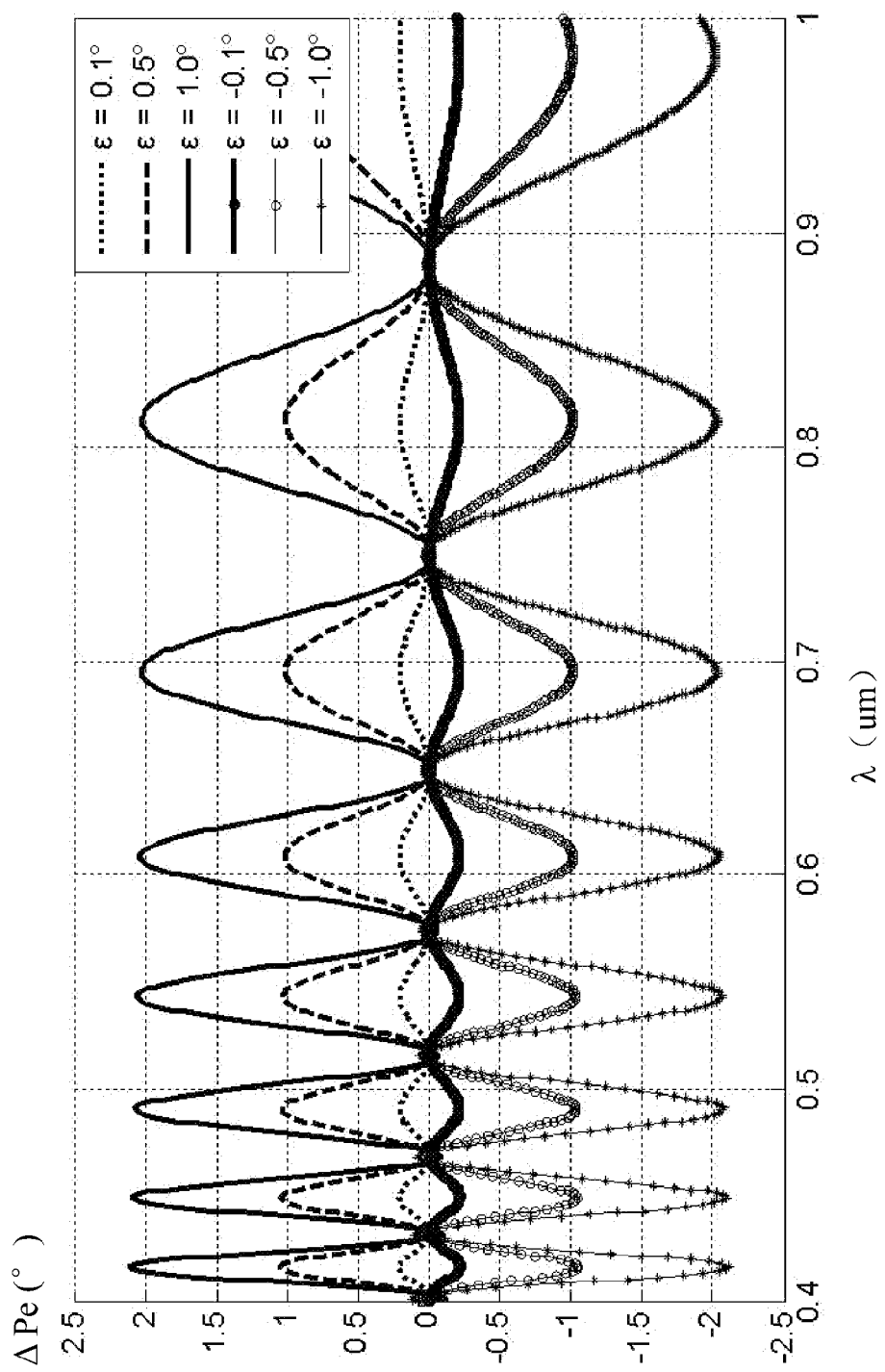
FIG. 3 illustrates fluctuation curves of the difference $\Delta P_e(\lambda)$ between equivalent rotary angle spectrums and an ideal spectrum of a quartz biplate when alignment errors exist ($\epsilon=\pm 0.1°$, $\pm 0.5°$, or $\pm 1.0°$)
Figure 4:
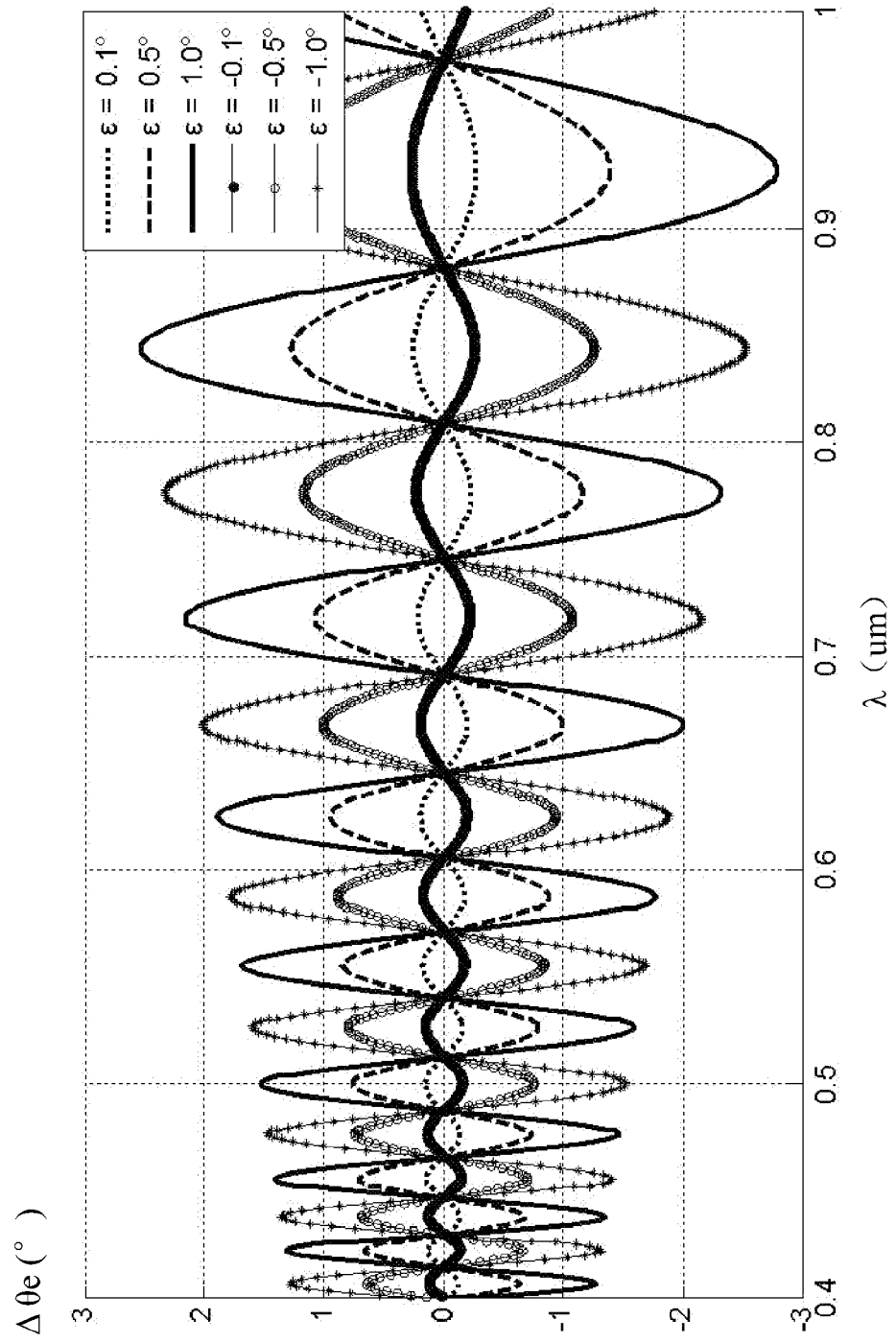
FIG. 4 illustrates fluctuation curves of the difference $\Delta \theta_e(\lambda)$ between equivalent rotary angle spectrums and the ideal spectrum of a quartz biplate when alignment errors exist ($\epsilon=\pm 0.1°$, $\pm 0.5°$, or $\pm 1.0°$)
Figure 5:
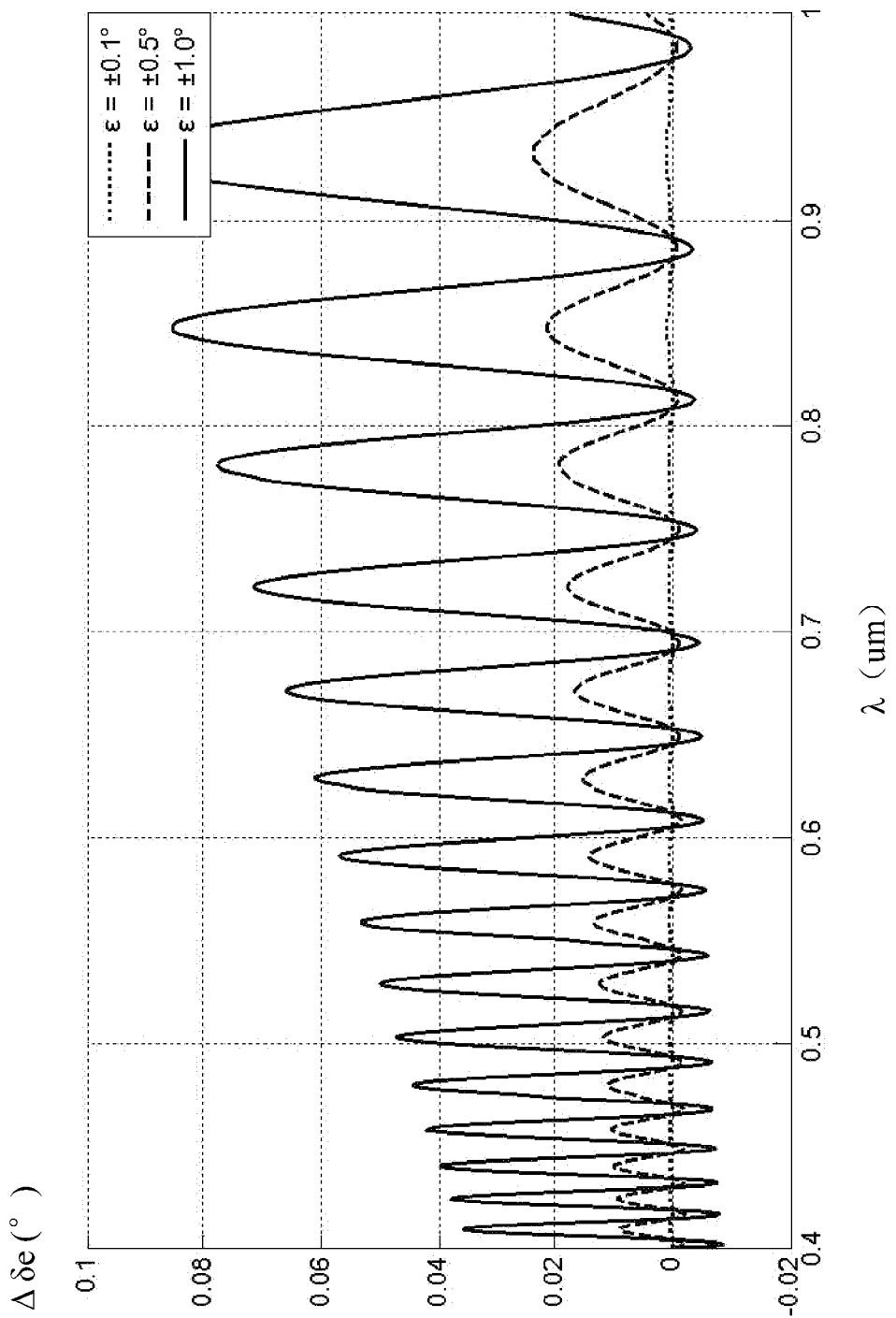
FIG. 5 illustrates fluctuation curves of the difference $\Delta \delta_e(\lambda)$ between equivalent rotary angle spectrums and the ideal spectrum of a quartz biplate when alignment errors exist ($\epsilon=\pm 0.1°$, $\pm 0.5°$, or $\pm 1.0°$)
Figure 6:
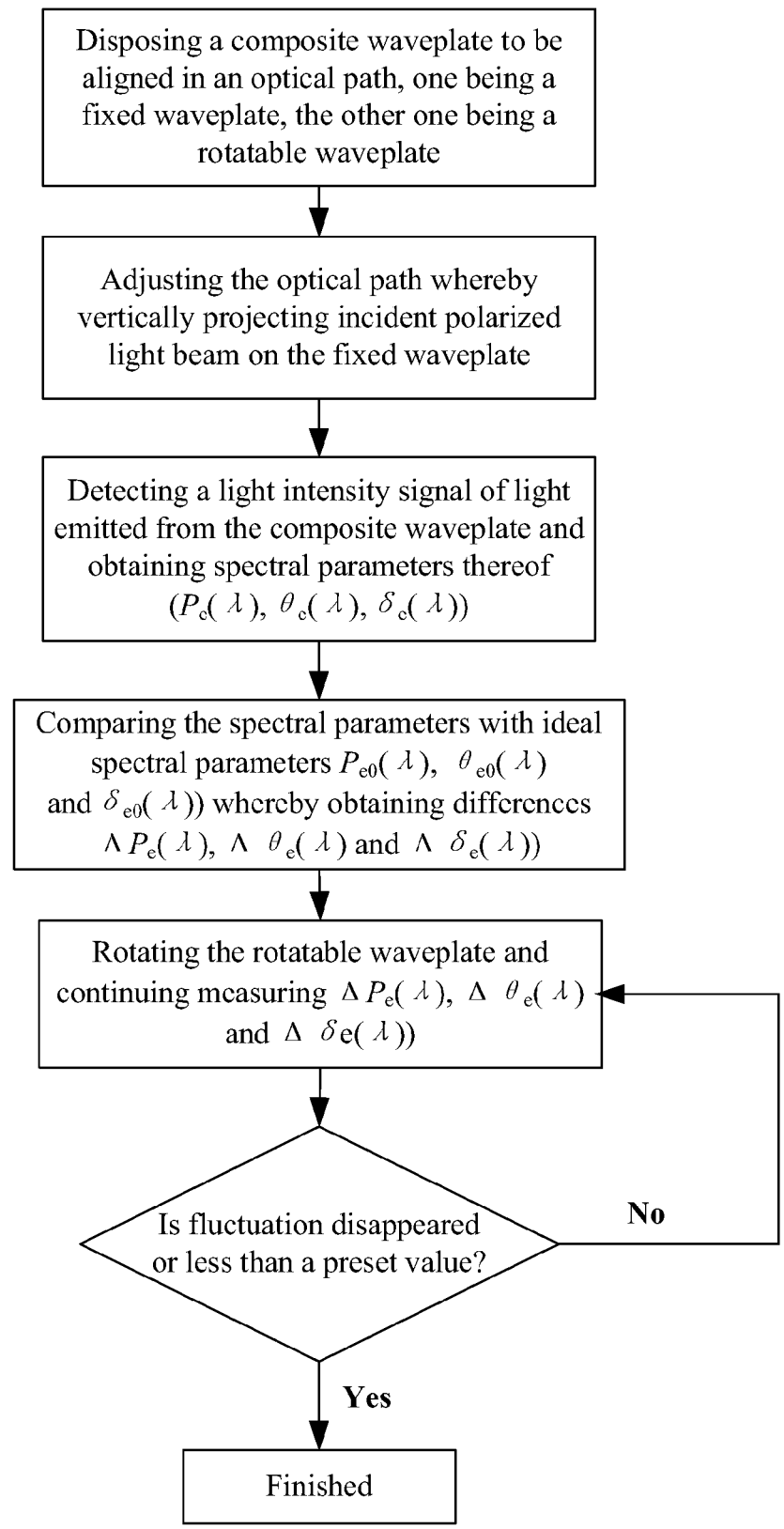
FIG. 6 is a flow chart of an alignment method for optical axes of a composite waveplate of an exemplary embodiment of the invention.

When the optical axes of the two waveplates are perpendicular to each other, namely $\alpha=|\theta_2-\theta_1|=90°$, it can be deduced from equations (5)-(8) that $P_e=0$, $\theta_e=\theta_1$, and $\delta_e=\delta_1-\delta_2$. Therefore, when the optical axes of the biplate is perfectly aligned, namely the angle between optical axes of the two single plates forming the biplate is 90°, the equivalent spectral parameters $P_e(\lambda)$, $\theta_e(\lambda)$, and $\delta_e(\lambda)$ of the composite waveplate are determined by the performance of the two single plates. If there is an alignment error $\epsilon$ between the optical axes of the two single plates forming the biplate, namely $\alpha=|\theta_2-\theta_1|=90°+\epsilon$, the differences $\Delta P_e(\lambda)$, $\Delta\theta_e(\lambda)$, and $\Delta\delta_e(\lambda)$ between the equivalent spectral parameters $P_e(\lambda)$, $\theta_e(\lambda)$, and $\delta_e(\lambda)$ of the composite waveplate and the ideal values $P_{e0}(\lambda)$, $\theta_{e0}(\lambda)$, and $\delta_{e0}(\lambda)$ corresponding thereto may have certain fluctuation, and amplitudes of the fluctuation are dependent on the alignment error $\epsilon$. FIGS. 3 to 5 illustrate that the differences between the equivalent spectral parameters and the ideal values of the quartz biplate fluctuate within a spectral range from 0.4 to 1.0 μm when different alignment errors exist ($\epsilon=\pm0.1°$, $\pm0.5°$, or $\pm1.0°$). Thicknesses of the two single plates are respectively 506.14 μm and 500 μm. In an ideal alignment condition, the optical axes of the two single plates are perpendicular to each other. FIG. 3 illustrates fluctuation curves of the differences $\Delta P_e(\lambda)$ of the equivalent rotary angle spectrums; FIG. 4 illustrates fluctuation curves of the differences $\Delta\theta_e(\lambda)$ of the equivalent axis azimuth spectrums; and FIG. 5 illustrates fluctuation curves of the differences $\Delta\delta_e(\lambda)$ of the equivalent retardance spectrums.

As shown in FIGS. 3 to 5, a fluctuation amplitude of the spectral curve depicting the difference $\Delta P_e(\lambda)$ of the equivalent rotary angle spectrum is approximately two times greater than the alignment error $\epsilon$; a fluctuation amplitude of the spectral curve depicting the difference $\Delta\theta_e(\lambda)$ of the equivalent axis azimuth is approximately three to five times greater than the alignment error $\epsilon$; and a fluctuation amplitude of the spectral curve depicting the difference $\Delta\delta_e(\lambda)$ of the equivalent retardance is approximately 0.04 to 0.1 times greater than the alignment error $\epsilon$. Therefore, fluctuation of the difference $\Delta P_e(\lambda)$ of the equivalent rotary angle spectrum and the difference $\Delta\theta_e(\lambda)$ of the equivalent axis azimuth spectrum is more sensitive to the alignment error of the composite waveplate than the difference $\Delta\delta_e(\lambda)$ of the equivalent retardance. Based on the above analysis, it is possible to achieve accurate alignment of the composite waveplate by detecting and controlling the fluctuation amplitudes of the equivalent spectral parameters $\Delta P_e(\lambda)$, $\Delta\theta_e(\lambda)$, and $\Delta\delta_e(\lambda)$ of the composite waveplate, and the alignment accuracy is higher than a method that only detects fluctuation in a retardance curve. In a word, the invention is capable of achieving accurate alignment of the composite waveplate even if the accuracy of a detection device for spectral parameters is limited.

Figure 7:
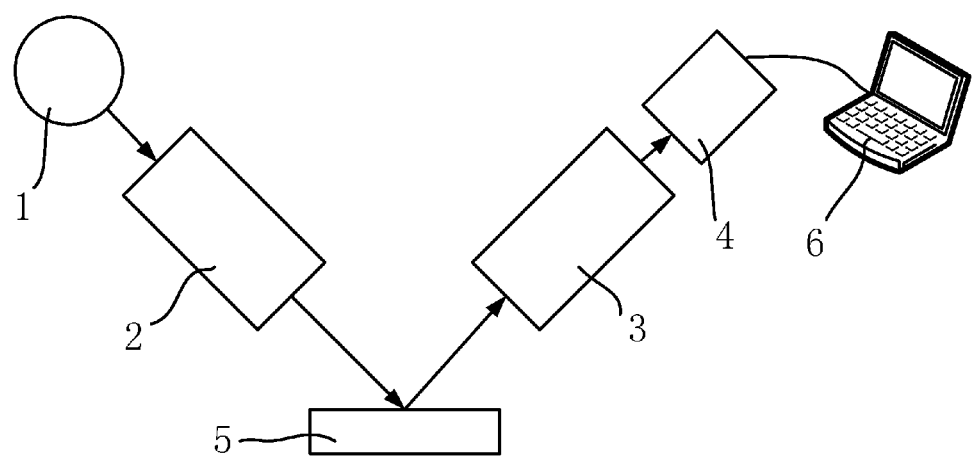
FIG. 7 is a schematic view of a dual rotating-compensator Mueller matrix ellipsometer.

As shown in FIG. 7, a Mueller matrix ellipsometer comprises a light source 1, a polarization generation arm 2, a polarization detection arm 3, a detector 4, a sample stage 5, and a computer 6. Each of the polarization generation arm 2 and the polarization detection arm 3 comprises a polarizer, a rotating compensator, and other devices. The polarizer of the polarization generation arm 2 is disposed in the front of the polarization generation arm 2, and the rotating compensator of the polarization generation arm 2 is disposed at the rear of the polarization generation arm 2, while the rotating compensator of the polarization detection arm 3 is disposed in the front thereof, and a polarizer thereof is disposed at the rear of the polarization detection arm 3. Light emitted from the light source 1 is non-polarized light, and is converted into linearly polarized light after passing through the polarizer of the polarization generation arm 2. After being modulated by the rotating compensator of the polarization generation arm 2, the polarized light is projected on a sample mounted on the sample stage 5. The polarization state of the polarized light is changed after the polarized light passes through the sample, and thus information of the sample is integrated with a light intensity signal of the polarized light. Light emitted from the sample is modulated by the rotating compensator of the polarization detection arm 3, then passes through the polarizer of the polarization detection arm 3, and is then detected by the detector 4. The computer 6 analyzes the light intensity signal detected by the detector 4 to obtain spectral parameters of the sample.

Figure 8:
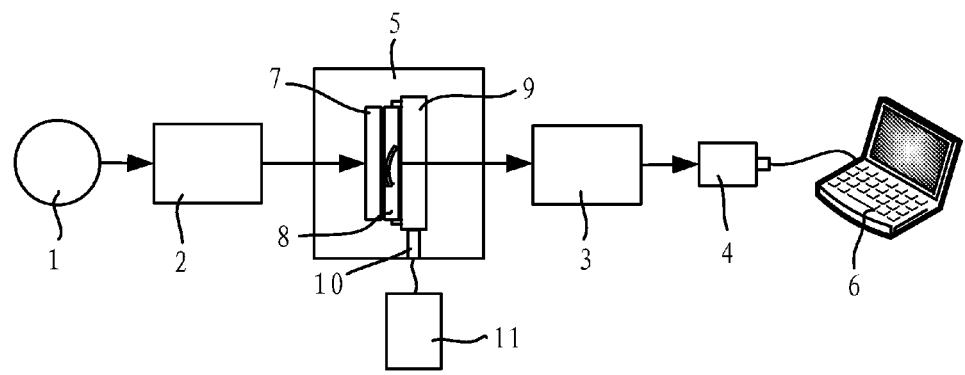
FIG. 8 schematically illustrates a device for alignment of a composite waveplate using a dual rotating-compensator Mueller matrix ellipsometer.

The method of the invention will be described below in details using a dual rotating-compensator Mueller matrix ellipsometer as an example:

(1) adjusting the dual rotating-compensator Mueller matrix ellipsometer to a straight-through (transmission) measurement mode; as shown in FIG. 8, the light source 1, the polarization generation arm 2, the polarization detection arm 3, and the detector 4 are on the same line; the light source 1 is turned on and an optical path thereof is adjusted so that light beam emitted from the polarization generation arm 2 can enter the polarization detection arm 3 and then be detected by the detector 4; at the same time optical paths of the polarization generation arm 2 and the polarization detection arm 3 are straight-through, and the dual rotating-compensator Mueller matrix ellipsometer is in the straight-through measurement mode;

(2) fixing a single plate of a composite waveplate to be aligned on a sample stage 5 so that this single plate functions as a fixed waveplate 7, and vertically projecting the light beam emitted from the polarization generation arm 2 on the fixed waveplate 7;

(3) connecting another single plate of the composite waveplate to be aligned to a high-accuracy rotating table 9 so that this single plate functions as a rotatable waveplate 8, disposing the high-accuracy rotating table 9 on the sample stage 5, and arranging the rotatable waveplate 8 in parallel to the fixed waveplate 7. Both of the rotatable waveplate 8 and the fixed waveplate 7 are perpendicular to the light beam. The high-accuracy rotating table 9 is hollow so that the light beam emitted from the composite waveplate to be aligned can enter the polarization detection arm 3. The high-accuracy rotating table 9 is connected to a step motor 10, and a step motor controller 11 is capable of controlling the step motor 10 to drive the high-accuracy rotating table 9 to rotate with high accuracy and definition. In this way, the rotatable waveplate 8 rotates with respect to the fixed waveplate 7;

(4) measuring the composite waveplate to be aligned via the dual rotating-compensator Mueller matrix ellipsometer, namely analyzing the light intensity signal detected by using the detector 4 and the computer 6, and obtaining spectral parameters $P_e(\lambda)$, $\theta_e(\lambda)$, and $\delta_e(\lambda)$ of the composite waveplate according to an equivalent model of the composite waveplate built in equations (3) to (8);

(5) comparing the spectral parameters $P_e(\lambda)$, $\theta_e(\lambda)$, and $\delta_e(\lambda)$ of the composite waveplate with the ideal spectral parameters $P_{e0}(\lambda)$, $\theta_{e0}(\lambda)$, and $\delta_{e0}(\lambda)$, whereby obtaining differences $\Delta P_e(\lambda)$, $\Delta \theta_e(\lambda)$, and $\Delta \delta_e(\lambda)$ therebetween;

(6) controlling the step motor 10 via the step motor controller 11 so that the high-accuracy rotating table 9 drives the rotatable waveplate 8 to rotate with respect to the fixed waveplate 7 at a certain angle, repeating steps (4) and (5), observing whether amplitudes of the differences $\Delta P_e(\lambda)$, $\Delta \theta_e(\lambda)$, and $\Delta \delta_e(\lambda)$ increase or decrease, rotating the rotatable waveplate 8 in the same direction as described above if the amplitudes decrease, and rotating the rotatable waveplate 8 in a reverse direction if the amplitudes increase; and (7) repeating step (6) until fluctuation of the differences $\Delta P_e(\lambda)$, $\Delta \theta_e(\lambda)$, and $\Delta \delta_e(\lambda)$ disappears or the fluctuation amplitudes thereof are smaller than preset values, so that the alignment of the composite waveplate is completed.

It should be noted that the above description is illustratively based on a composite waveplate formed by two single plates. If the composite waveplate comprises more than two single plates, two single plates are chosen and aligned to each other according to the above-mentioned steps (1) to (7), and then fixed. Next the fixed waveplates as a whole are aligned to the next single plate, and steps (1) to (7) are repeated until all single-plates are aligned to each other, and at the time alignment of the composite waveplate is completed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for aligning optical axes of a composite waveplate, for any two adjacent waveplates of the composite waveplate, the method comprising:
    a) fixing a first one of the two adjacent waveplates to be a fixed waveplate and arranging the second one of the two adjacent waveplates to be a rotatable waveplate in parallel to the fixed waveplate and capable of rotating about a central axis with respect to the fixed waveplate;
    b) vertically irradiating polarized light on the fixed waveplate, and allowing the light to sequentially pass through the fixed waveplate and the rotatable waveplate;
    c) detecting and analyzing a light intensity signal of the emitted light to obtain spectral parameters of a composite waveplate containing the fixed waveplate and the rotatable waveplate;
    d) comparing the spectral parameters of the composite waveplate with ideal spectral parameters to obtaining differences between the spectral parameters of the composite waveplate and the ideal spectral parameters; and
    e) rotating the rotatable waveplate rotating about a central axis with respect to the fixed waveplate and adjusting a rotation angle of the rotatable waveplate until the differences between the spectral parameters of the composite waveplate and the ideal spectral parameters are smaller than preset values.

2. The method of claim 1, wherein
    the spectral parameters of the composite waveplate comprise an equivalent rotary angle spectrum $P_e(\lambda)$, an equivalent axis azimuth spectrum $\theta_e(\lambda)$, and an equivalent retardance spectrum $\delta_e(\lambda)$; and
    the equivalent rotary angle spectrum $P_e(\lambda)$, the equivalent axis azimuth spectrum $\theta_e(\lambda)$, and the equivalent retardance spectrum $\delta_e(\lambda)$ are calculated according to the following equations:

$$P_e = -\arctan\left\{\operatorname{Re}\left[\frac{(m_{21} - m_{12})}{(m_{11} + m_{22})}\right]\right\}$$

$$\theta_e = \frac{1}{2}\arctan\left\{\operatorname{Re}\left[\frac{2(m_{21}m_{22} + m_{11}m_{12})}{(m_{11}^2 + m_{21}^2 - m_{12}^2 - m_{22}^2)}\right]\right\}$$

$$\delta_e = \arg\left(\frac{r_{11}}{r_{22}}\right)$$

wherein $m_{ij}$ represents four elements of a matrix obtained by multiplying a matrix $M(\delta_1, \theta_1)$ by $M(\delta_2, \theta_2)$; $M(\delta_1, \theta_1)$ and $M(\delta_2, \theta_2)$ are characteristic matrices of the waveplates; $r_{ij}$ represents four elements of a matrix obtained by multiplying a $$\text{matrix} \begin{bmatrix} \cos P_e & -\sin P_e \\ \sin P_e & \cos P_e \end{bmatrix}$$

$$\text{by} \begin{bmatrix} \cos\theta_e & \sin\theta_e \\ -\sin\theta_e & \cos\theta_e \end{bmatrix}, \begin{bmatrix} m_{11} & m_{12} \\ m_{21} & m_{22} \end{bmatrix}, \text{and} \begin{bmatrix} \cos\theta_e & -\sin\theta_e \\ \sin\theta_e & \cos\theta_e \end{bmatrix};$$

$i=1$ or $2$; $j=1$ or $2$; $\delta_1$ is a retardance of the fixed waveplate; $\delta_2$ is a retardance of the rotatable waveplate; $\theta_1$ is an angle formed by an optical axis of the fixed waveplate that is vertically disposed and a horizontal direction; and $\theta_2$ is an angle formed by an optical axis of the rotatable waveplate that is vertically disposed and a horizontal direction.

3. The method of claim 1, wherein
    the spectral parameters of the composite waveplate are detected by an ellipsometer; and
    the ellipsometer is a dual rotating-compensator Mueller matrix ellipsometer.

4. The method of claim 2, wherein
    the spectral parameters of the composite waveplate are detected by an ellipsometer; and
    the ellipsometer is a dual rotating-compensator Mueller matrix ellipsometer.

5. The method of claim 3, wherein
    the waveplates are disposed on a sample stage between a polarization generation arm and a polarization detection arm of the ellipsometer;
    a light beam is emitted from the polarization generation arm and is then vertically projected on the composite waveplate, then the light beam passes through the polarization detection arm and is finally detected to obtain the spectral parameters.

6. The method of claim 4, wherein
    the waveplates are disposed on a sample stage between a polarization generation arm and a polarization detection arm of the ellipsometer;
    a light beam is emitted from the polarization generation arm and is then vertically projected on the composite waveplate, then the light beam passes through the polarization detection arm and is finally detected to obtain the spectral parameters.

7. The method of claim 5, wherein
    the rotatable waveplate is disposed on a high-accuracy rotating table; and
    the high-accuracy rotating table is fixed on the sample stage and is adapted to be capable of rotating about the central axis with respect to the fixed waveplate.

8. The method of claim 1, wherein the composite waveplate comprises three or more waveplates, and the fixed waveplate is a fixed composite waveplate comprising multiple waveplates having aligned axes.

* * * * *